(12) United States Patent
Tanaka

(10) Patent No.: US 7,665,703 B2
(45) Date of Patent: Feb. 23, 2010

(54) SEAT DEVICE FOR VEHICLE

(75) Inventor: Toshiyuki Tanaka, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 286 days.

(21) Appl. No.: 11/165,334

(22) Filed: Jun. 24, 2005

(65) Prior Publication Data
US 2005/0285007 A1 Dec. 29, 2005

(30) Foreign Application Priority Data
Jun. 28, 2004 (JP) ............... 2004-190398

(51) Int. Cl.
F16M 13/00 (2006.01)
(52) U.S. Cl. ............... 248/429; 248/428; 248/430
(58) Field of Classification Search ........... 248/424, 248/429, 430
See application file for complete search history.

(56) References Cited

U.S. PATENT DOCUMENTS

| 4,451,078 | A | * | 5/1984 | Maeda | 296/187.12 |
|---|---|---|---|---|---|
| 4,909,570 | A | * | 3/1990 | Matsuhashi | 297/341 |
| 4,964,608 | A | * | 10/1990 | Rogala et al. | 248/429 |
| 5,273,241 | A | * | 12/1993 | Droulon | 248/429 |
| 5,407,165 | A | * | 4/1995 | Balocke | 248/429 |
| 5,800,015 | A | * | 9/1998 | Tsuchiya et al. | 297/331 |
| 5,897,091 | A | * | 4/1999 | Hayakawa et al. | 248/430 |
| 6,059,345 | A | * | 5/2000 | Yokota | 296/65.14 |
| 6,098,946 | A | * | 8/2000 | Sechet et al. | 248/424 |
| 6,102,478 | A | * | 8/2000 | Christopher | 297/341 |
| 6,286,799 | B1 | * | 9/2001 | Fujii | 248/430 |
| 6,305,746 | B1 | * | 10/2001 | Ikegaya et al. | 297/344.1 |
| 6,341,819 | B1 | * | 1/2002 | Kojima et al. | 297/341 |
| 6,349,914 | B1 | * | 2/2002 | Yoshida et al. | 248/429 |
| 6,439,531 | B1 | * | 8/2002 | Severini et al. | 248/423 |
| 6,557,919 | B2 | * | 5/2003 | Suga et al. | 296/65.07 |
| 6,631,879 | B2 | * | 10/2003 | Hibino et al. | 248/429 |
| 6,691,971 | B2 | * | 2/2004 | Yamada et al. | 248/430 |
| 6,869,057 | B2 | * | 3/2005 | Matsumoto et al. | 248/430 |

(Continued)

FOREIGN PATENT DOCUMENTS

BE 899282 7/1984

(Continued)

OTHER PUBLICATIONS

European Search Report dated Nov. 18, 2009.

Primary Examiner—J. Allen Shriver, II
Assistant Examiner—Nkeisha J Smith
(74) Attorney, Agent, or Firm—Finnegan, Henderson, Farabow, Garrett & Dunner, LLP

(57) ABSTRACT

A seat device for a vehicle comprises a lower rail fixed on the vehicle floor so as to extend in a longitudinal direction of the vehicle, an upper rail mounted to the lower rail so as to be slidable and supporting a seat body, a first lock mechanism for locking the upper rail at a first position to the lower rail and a second lock mechanism being locked for limiting the upper rail at a predetermined position so as not to move further back than the predetermined position when the upper rail is unlocked by means of the first lock mechanism, the second lock mechanism being unlocked when the upper rail is locked by means of the first lock mechanism.

5 Claims, 7 Drawing Sheets

U.S. PATENT DOCUMENTS

| | | | |
|---|---|---|---|
| 6,923,415 B2 * | 8/2005 | Yokoi et al. | 248/424 |
| 6,945,607 B2 * | 9/2005 | Kojima | 297/341 |
| 6,953,178 B2 * | 10/2005 | Yamada et al. | 248/429 |
| 6,981,681 B2 * | 1/2006 | Matsumoto | 248/424 |
| 7,195,303 B2 * | 3/2007 | Nihonmatsu et al. | 296/65.13 |
| 7,243,995 B2 * | 7/2007 | Nakaya et al. | 297/378.1 |
| 7,252,319 B2 * | 8/2007 | Toyota et al. | 296/65.09 |
| 7,273,254 B2 * | 9/2007 | Fujita et al. | 297/331 |
| 2002/0190182 A1 * | 12/2002 | Flick et al. | 248/430 |
| 2003/0085330 A1 * | 5/2003 | Lee | 248/430 |
| 2005/0103968 A1 * | 5/2005 | Yamada et al. | 248/429 |
| 2005/0247846 A1 * | 11/2005 | Jeong | 248/429 |
| 2006/0022109 A1 * | 2/2006 | Yamada et al. | 248/429 |
| 2006/0108492 A1 * | 5/2006 | Kojima et al. | 248/429 |
| 2006/0131470 A1 * | 6/2006 | Yamada et al. | 248/424 |
| 2007/0170743 A1 * | 7/2007 | Kinoshita et al. | 296/65.13 |

FOREIGN PATENT DOCUMENTS

| | | |
|---|---|---|
| CN | 1412040 | 4/2003 |
| DE | 102 31 097 | 1/2004 |
| JP | 10-100753 | 4/1998 |
| JP | 10-203210 | 8/1998 |
| JP | 3142204 | 12/2000 |

* cited by examiner

SEAT DEVICE FOR VEHICLE

CROSS REFERENCE TO RELATED APPLICATIONS

This application is based on and claims priority under 35 U.S.C. § 119 to Japanese Patent Application 2004-190398, filed on Jun. 28, 2004, the entire content of which is incorporated herein by reference.

FIELD OF THE INVENTION

The present invention relates to a seat device for controlling a slide of a vehicle seat.

BACKGROUND

A known seat device for a vehicle disclosed in H10-100753A includes a seat cushion, a stepped portion and a stopper unit. The seat cushion is attached to a slide rail so as to be slidabe, the stepped portion protrudes toward the slide rail, and the stopper unit moves in an upward/downward direction in conjunction with a rotation of the seat cushion.

When the seat cushion is rotated so as to tilt forward, the stopper unit moves downward so as to contact to the stepped portion, and when the seat cushion is rotated so as to tilt backward, the stopper unit moves upward so as to disengage from the stepped portion. When the stopper unit disengages from the stepped portion, the slide rail becomes slidable. Further, outside a range X, the stopper unit contacts with an upper surface of the stepped portions so as not to move toward an advancing end, and as a result of which, the rotation of the seat cushion is limited. Specifically, when the seat cushion is tilted forward, the seat cushion is limited so as not to move outside the range X, and outside the range X, the seat is limited so as not to tilt forward. In this circumstance, the seat cushion cannot be seated outside the range X.

A range in which the seat body (seat cushion) can slide is changed depending on the rotational position of the seat cushion, however, because the seat body can slide within the range without any limitation, the seat body may hit, for example an interior equipment, which is positioned within the range. Thus, when the seat body is moved widely in a longitudinal direction, in accordance with this movement, an inertial force is applied to the interior equipment, and when the seat body hits the interior equipment, a large impact force is applied to the interior equipment.

Thus, a need exists to provide a seat device for a vehicle for preventing a seat body from hitting with a large impact force.

SUMMARY OF THE INVENTION

According to an aspect of the present invention, a seat device for a vehicle comprises a lower rail fixed on the vehicle floor so as to extend in a longitudinal direction of the vehicle, an upper rail mounted to the lower rail so as to be slidable and supporting a seat body, a first lock mechanism for locking the upper rail at a first position to the lower rail and a second lock mechanism being locked for limiting the upper rail at a predetermined position so as not to move further back than the predetermined position when the upper rail is unlocked by means of the first lock mechanism, the second lock mechanism being unlocked when the upper rail is locked by means of the first lock mechanism.

According to another aspect of the present invention, a seat device for a vehicle comprises a lower rail fixed to a vehicle floor so as to position in a longitudinal direction of a vehicle, an upper rail mounted to the lower rail so as to be slidable, a lock lever rotatably supported by the upper rail, a lock claw formed on the lock lever, lock holes formed on the lower rail continuously in a longitudinal direction thereof, a first lock mechanism by which the lock claw is engaged with at least one of the lock holes in order to lock the upper rail at a first position to the lower rail, a stopper unit rotatably supported by the upper rail, a bracket fixed on the lower rail, an engaging lever rotatably fixed to the upper rail for maintaining the stopper unit in an engaged state, and a second lock mechanism for limiting the upper rail so as not to move further back than a predetermined position by rotating the engaging lever in order to maintain the stopper unit in the engaged state, in which the stopper unit is engaged with the bracket.

According to further aspect of the present invention, a seat device for a vehicle comprises a lower rail fixed on the vehicle floor so as to extend in a longitudinal direction of the vehicle, an upper rail mounted to the lower rail so as to be slidable, a slide rail provided on top of the upper rail in a vehicle width direction and supporting the seat body so as to be slidable, a lock lever rotatably supported by the upper rail, a lock claw formed on the lock lever, lock holes formed on the lower rail continuously in a longitudinal direction thereof, a first lock mechanism by which the lock claw is engaged with at least one of the lock holes in order to lock the upper rail at a first position to the lower rail, a stopper unit rotatably supported by the upper rail, a bracket fixed on the lower rail, a stopper bracket for maintaining the stopper unit so as to be in a engaged state when the seat body is in a range of a vehicle width direction, and a second lock mechanism for limiting the upper rail so as not to move further back than a predetermined position by maintaining the stopper unit so as to be in the engaged state, in which the stopper unit is engaged with the bracket, by means of the stopper bracket.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
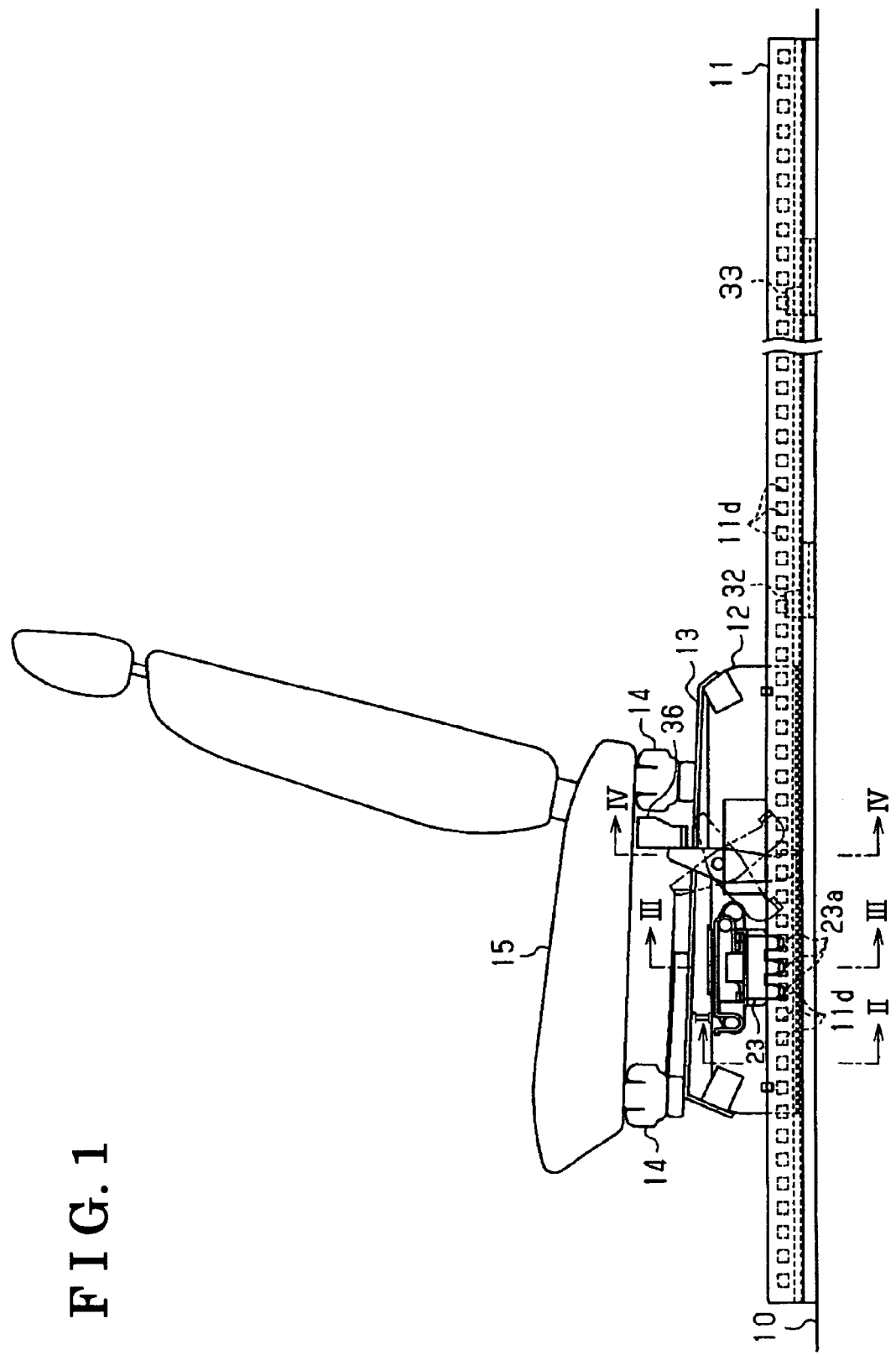
FIG. 1 illustrates a side view indicating a seat device for a vehicle according to an embodiment of the present invention.

An embodiment to implement the present invention will be explained in accordance with drawings attached hereto. FIG. 1 illustrates a side view indicating a seat device for a vehicle, which is mounted to a vehicle such as an automobile. As shown in FIG. 1, the seat device for a vehicle includes a pair of lower rails 11 and a pair of upper rails 12. Specifically, the lower rails 11 are extending in a longitudinal direction of the vehicle and fixed on a vehicle floor 10 in a vehicle compartment, and one of the upper rails 12 is slidably attached to one of the lower rails 11, and the other of the upper rails 12 is also slidably attached to the other of the lower rails 11.

The seat device for a vehicle further includes a supporting plate 13, a pair of slide rails 14 and a seat body 15. Specifically, the supporting plate 13 is supported by the upper rails 12, the slide rails 14 are provided onto the supporting plate 13 so as to extend in a vehicle width direction, and the seat body 15 is slidably supported by the slide rails 14.

In this configuration, the seat body 15 can slide in a longitudinal direction on the lower rails 11, and also slide in a vehicle width direction on the slide rails 14. The seat device for a vehicle further includes a first lock mechanism 20 for fixing the upper rails 12 at a certain position and a second lock mechanism 30 for limiting the upper rails 12 at a predetermined position so as not to move further back than the predetermined position.

Figure 2:
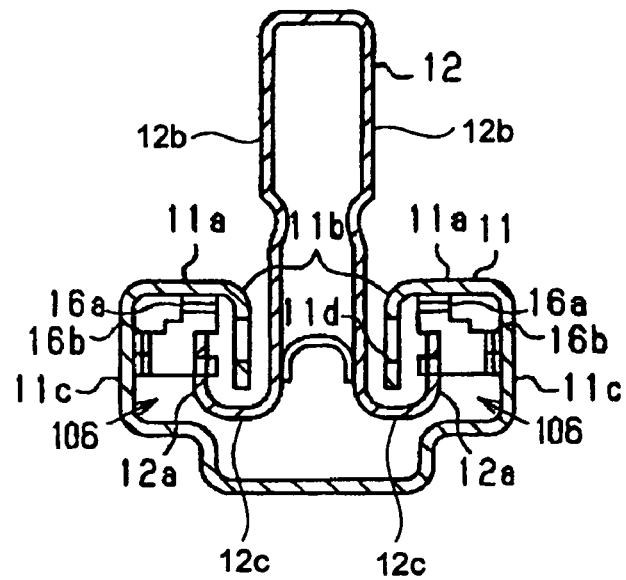
FIG. 2 illustrates a cross section of a part of the seat device for a vehicle along a II-II line in FIG. 1.

FIG. 2 illustrates a cross section of one lower rail 11 and one upper rail 12 along a II-II line in FIG. 1. A structure of the lower rail 11 will be explained in accordance with FIG. 2. As shown in FIG. 2, the lower rail 11 is formed in a U-shape in cross section so as to open on upper portion thereof. Specifically, as shown in a cross section in FIG. 2, the lower rail 11 includes two outer side wall portions 11c, two upper surface portions 11a and two inner side wall portions 11b. Specifically, each of the outer side wall portions 11c is extending in a vertical direction, and a top end of each of the outer side wall portions 11c is bent and extending inward so as to form the upper surface portions 11a. Further, each of the upper surface portions 11a is bent at an inner portion thereof and extending in a downward direction so as to form the inner side wall portions 11b. Furthermore, as shown in FIG. 1, each of the inner side wall portions 11b includes plural lock holes 11d. As described later, the lock holes 11d are used when the upper rails 12 slide on the lower rails 11.

A structure of the upper rail 12 will also be explained in accordance with FIG. 2. As shown in FIG. 2, the upper rail 12 is formed in an inverted U-shape in cross section so as to open on lower portion thereof. Specifically, as shown in FIG. 2, the upper rail 12 includes two inner side wall portions 12b, two lower surface portions 12c and two outer side wall portions 12a. Specifically, each of the inner side wall portions 12b are extending in a vertical direction, and a lower end of each of the inner side wall portions 12b are bent and extending outward so as to form the lower surface portions 12c. Further, each of the lower surface portions 12c is bent at an outer portion thereof and extending in an upper direction so as to form each of the outer side wall portions 12a. The upper rail 12 is mounted to the lower rail 11 in a manner where each of the outer side wall portions 12a of the upper rail 12 is positioned between each of the outer side wall portions 11c and each of the inner side wall portions 1b.

Further, a roller member 16 is attached on each of the outer side wall portions 12a of the upper rail 12. More specifically, each of the roller members 16 includes a roller 16a, which rolls on an inner surface of each of the upper surface portions 11a of the lower rail 11, and a roller 16b, which rolls on an inner surface of each of the outer side wall portions 11c of the lower rail 11.

An elastic member 106, being elastically deformed in an inversed U-shape in cross section, is provided between the inner side wall portions 12b of the upper rail 12 in order to apply a force to each of the inner side wall portions 12b in an outward direction. Thus, each of the rollers 16b of each of the roller members 16 can firmly contact to each of the outer side wall portions 11c of the lower rail 11, as a result, the upper rail 2 can slide on the lower rail 11 in a manner where each of the rollers 16b rolls on each of the outer side wall portions 11c.

[First Lock Mechanism]

Figure 3:
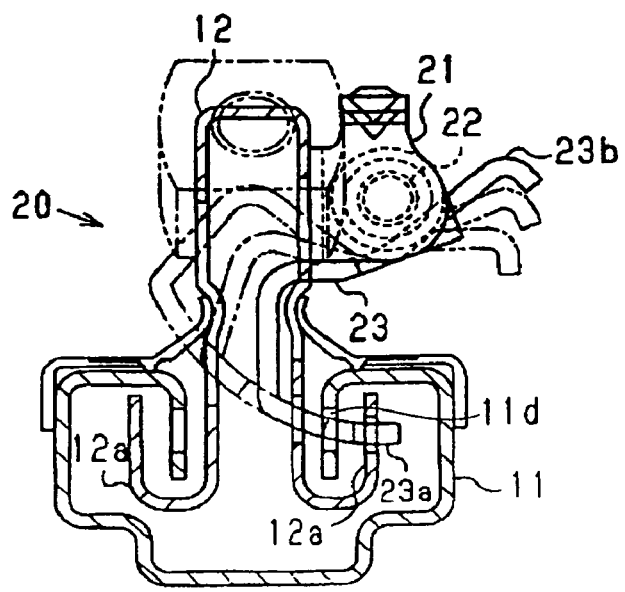
FIG. 3 illustrates a cross section of a part of the seat device for a vehicle along a III-III line in FIG. 1.

A configuration of the first lock mechanism 20 will be explained in accordance with FIG. 3. FIG. 3 illustrates a cross section of the seat device for a vehicle along a III-III line in FIG. 1.

By means of the first lock mechanism 20 locks, the upper rail 12 is locked to the lower rail 11 so as not to move in a longitudinal direction of the rails. Specifically, as shown in FIG. 3, the first lock mechanism 20 includes a bracket 21, which is fixed to the upper rail 12, and a lock lever 23, which is supported by the bracket 21 so as to be rotatable relative to a shaft 22.

Further, the lock lever 23 includes three lock claws 23b, which are inserted in the lock holes 11d of the lower rail 11 as shown in FIG. 1, and an actuating piece 23a by which the lock lever 23 is rotated relative to the shaft 22. The actuating piece 23a is positioned so as to be pressed down by means of the pressing lever 18, which will be described later.

In a normal state, the lock lever 23 is positioned in a manner where the lock claws 23a thereof is inserted into the lock holes 11d as shown in a solid line in FIG. 3. When the actuating piece 23b is pressed in a downward direction, the lock lever 23 is rotated relative to the shaft 22 in a clockwise direction so that the lock claws 23a are disengaged from the lock holes 11d (an unlock state). Thus, after the first lock mechanism becomes in the unlock state, the upper rail 12 (seat body 15) becomes slidable on the lower rail 11 in a longitudinal direction thereof. The upper rail 12 includes an opening so that the lock lever 23 can be rotated within such opening as shown in a chain double-dashed line in FIG. 3.

As shown in FIG. 1, the lock holes 11d of the first lock mechanism 20 are formed within an entire length of the lower rail 11 in a longitudinal direction thereof, and the three lock claws 23a of the lock lever 23 are engaged with any three of the lock holes 11d. Specifically, by means of the first lock mechanism 20, the upper rail 12 is maintained to the lower rail II at plural portions, specifically, the upper rail 12 is locked to the lower rail II at a first position, which is selected from the plural portions.

[Second Lock Mechanism]

Figure 4A:
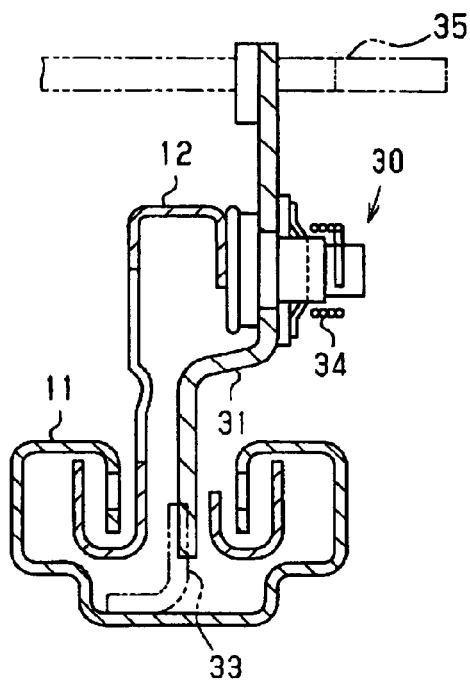
FIG. 4(A) illustrates a cross section of a part of the seat device for a vehicle shown in FIG. 1 along a IV-IV line.
Figure 4B:
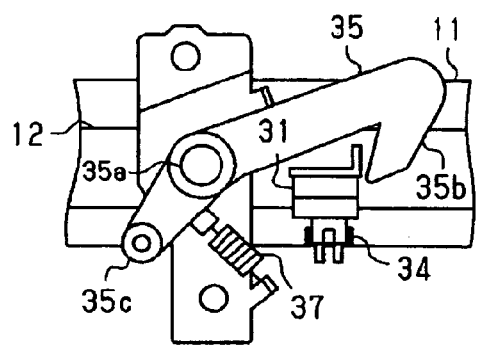
FIG. 4(B) illustrates a flat view of FIG. 4(A) seen from the upper side thereof.
Figure 5:
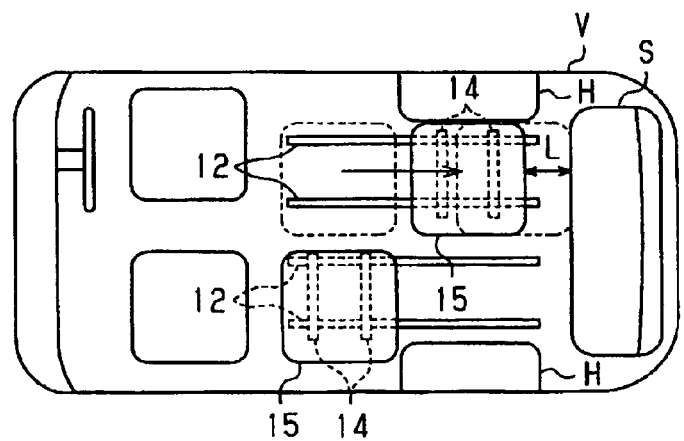
FIG. 5 illustrates a flat view of an interior of the vehicle according to the present embodiment.
Figure 6A:
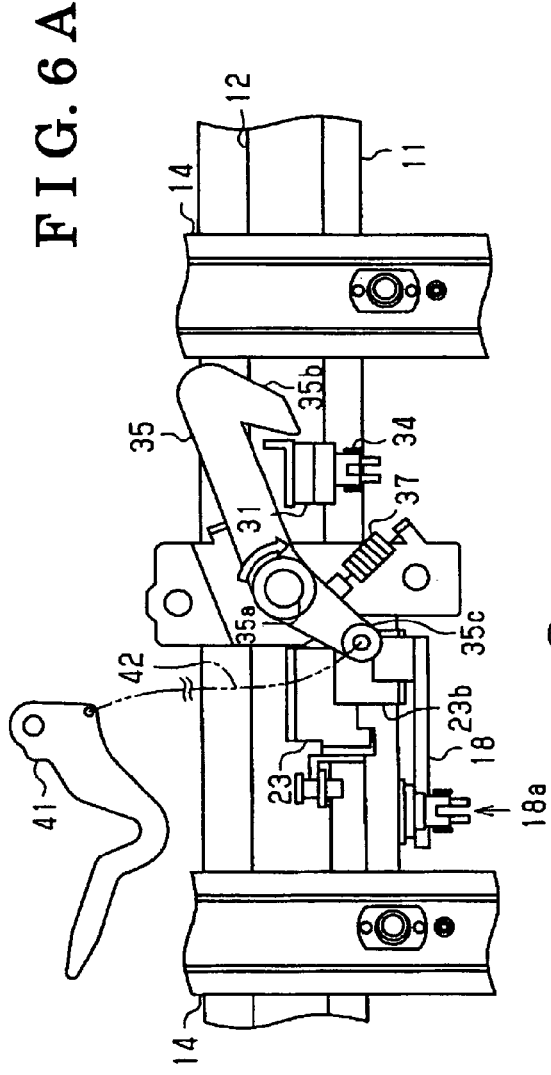
FIG. 6(A) illustrates a flat view for explaining a first lock mechanism and a second lock mechanism according to the embodiment.
Figure 6B:
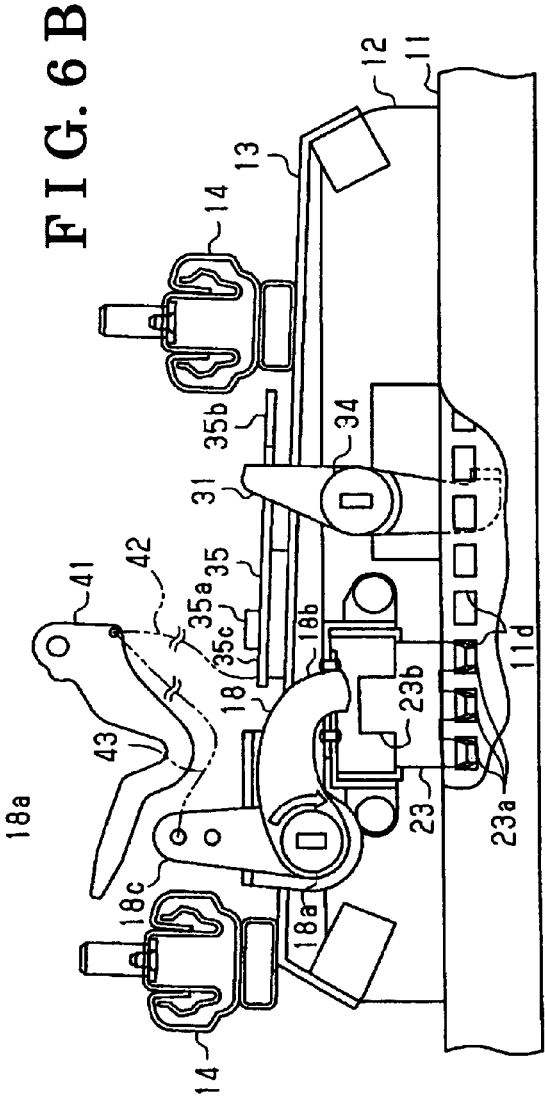
FIG. 6(B) illustrates a side view of for explaining the first and second lock mechanisms shown in FIG. 6(A)
Figure 7:
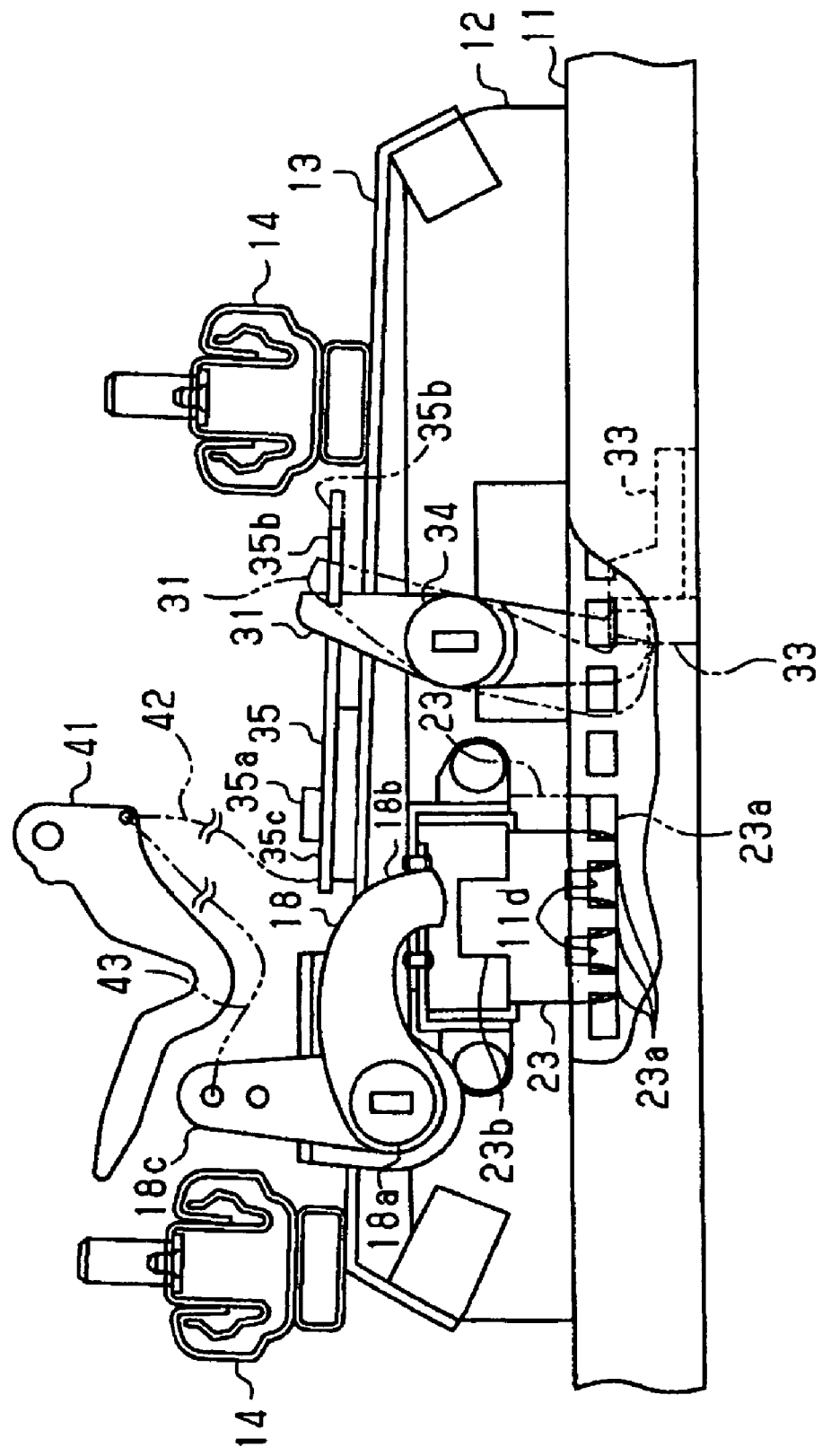
FIG. 7 illustrates a side view for explaining an actuation of the seat device for a vehicle.
Figure 8A:
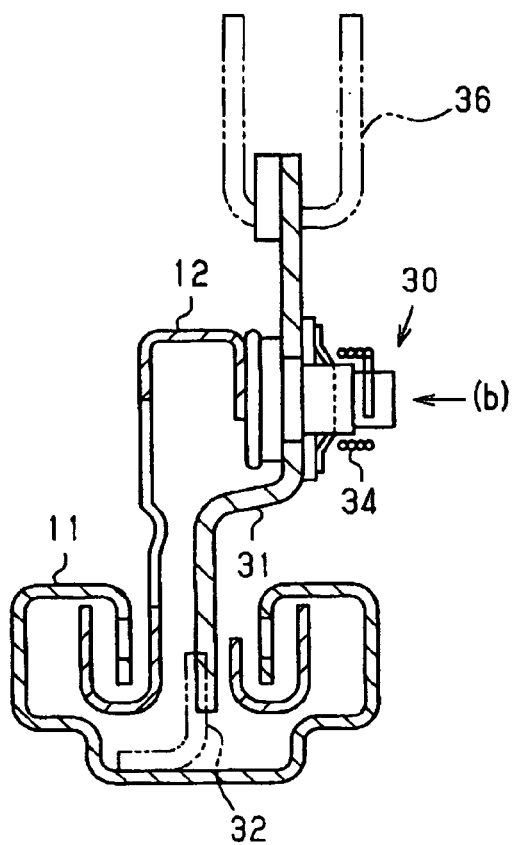
FIG. 8(A) illustrates an enlarged view of the cross section in FIG. 4(A) in which a stopper unit is supported by a stopper bracket.
Figure 8B:
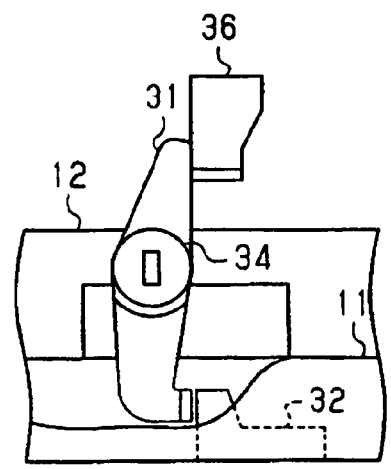
FIG. 8(B) illustrates a side view of the vehicle seat mechanism shown in FIG. 8(A) seen from the right thereof.
Figure 9:
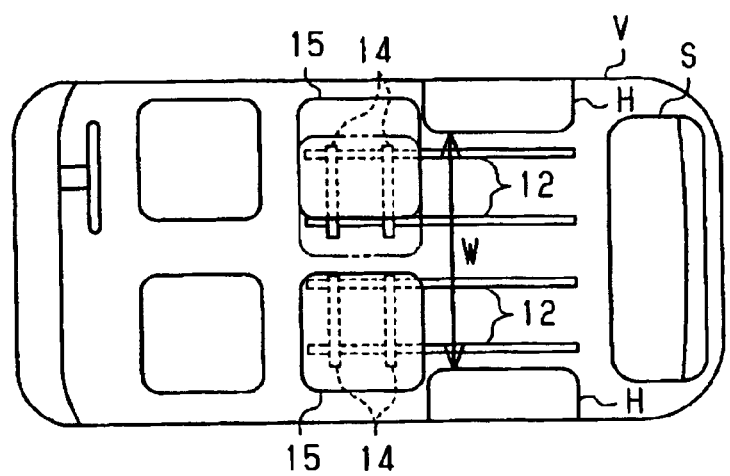
FIG. 9 illustrates a flat view of an interior of the vehicle of the present embodiment and FIG. 10 illustrates a side view of a condition where a seat body, which is shown in FIG. 1, is moved to a rear end of a lower rail.

A configuration of the second lock mechanism 30 will be explained in accordance with FIGS. 4 through 9. FIG. 4(A) illustrates a cross section of a part of the seat device for a vehicle shown in FIG. 1 along a IV-IV line, FIG. 4(B) illustrates a flat view of FIG. 4(A) seen from the upper side thereof, FIG. 5 illustrates a flat view of an interior of the vehicle in the present embodiment, the FIG. 6(A) illustrates a flat view for explaining the first lock mechanism and the second lock mechanism of the embodiment, FIG. 6(B) illustrates a side view of the first and second lock mechanisms shown in FIG. 6(A), FIG. 7 illustrates a side view for explaining an actuation of the seat device for a vehicle, FIG. 8(A) illustrates an enlarged view of the cross section in FIG. 4(A) in which a stopper unit 31 is supported by the stopper bracket, FIG. 8(B) illustrates a side view of the vehicle seat mechanism shown in FIG. 8(A) seen from the right thereof, and FIG. 9 illustrates a flat view of an interior of the vehicle in the present embodiment.

By means of the second lock mechanism 30, the upper rail 12, which becomes slidable in a longitudinal direction of the vehicle after the first lock mechanism 20 is unlocked, can be limited so as not to move further back than predetermined positions (a first predetermined position and a second predetermined position) of the upper rail 12. Specifically, as shown in FIG. 4(A) and FIG. 4(B), the second lock mechanism 30 includes a stopper unit 31, and the stopper unit 31 is maintained by means of an engaging lever 35 or a stopper bracket 36 so as to be in an upright position (engaged state) in order to limit the upper rail 12 so as not to move further back than a position of a first bracket 32 or a second bracket 33. The bracket 32 is attached to a bottom portion of the lower rail 11 at rear of a central portion of the lower rail 11, and the bracket 33 is also attached to a bottom portion of the lower rail 11 at rear of the bracket 32.

More specifically, the stopper unit 31 is fixed to the upper rail 12 so as to be rotatable, and a spiral spring 34 is provided at a central point of the rotation of the stopper unit 31 in order to restore and maintain the stopper unit 31, which is rotated by means of the brackets 32 and 33, so as to be in a upright position (a position shown in FIG. 4(A)) at which the spiral spring 34 can be engaged with the first bracket 32 is set as a first predetermined position, and a position of the seat body 15 at which the stopper unit 31 engages with the second bracket 33 is set as a second predetermined position.

First, a condition in which the stopper unit 31, which is maintained by means of the engaging lever 35 so as to be in the upright position, will be explained. In this condition, the second lock mechanism 30 limits the upper rail 12 (seat body 15) at the first predetermined position so as not slide in a rearward direction by means of the stopper unit 31, the second bracket 33 and the engaging lever 35. A configuration where the seat body 15 is limited at a second predetermined position so as not to move further back than the position of the second bracket 33 will be explained below.

As shown in FIG. 4(A) and FIG. 4(B), the engaging lever 35 includes a central point 35a, at which the engaging lever 35 is fixed to the upper rail 12 so as to be rotatable, and a top end portion 35b, which is bent so as to be engaged with the upper end portion of the stopper unit 31. In this configuration, the stopper unit 31 is maintained in the upright position (engaged state) in a manner where the upper end portion thereof is engaged with the engaging lever 35.

On an opposite side where the top end portion 35b is formed relative to the central point 35a, a coil spring 37 is provided in order to apply a force to the engaging lever 35 in an anticlockwise direction so as to disengage the top end portion 35b of the engaging lever 35 from the top end portion of the stopper unit 31. On the same side where the coil spring 37 is provided, a connecting portion 35c, to which a second connecting member 42 is connected, is provided. By means of the second connecting member 42, the operation force is transmitted from the unlock lever 41 to the engaging lever 35.

When a force is transmitted from the unlock lever 41 to the engaging lever 35, the engaging lever 35 is rotated in a clockwise direction so as to be engaged at an upper end portion 35b thereof with an top end portion of the stopper unit 31. Specifically, when the unlock lever 41 is operated, the top end portion 35b of the engaging lever 35 is engaged with the upper end portion of the stopper unit 31, so that the stopper unit 31 is maintained so as to be in the upright position.

Then, when the upper rail 12 (seat body 15) becomes slidable in a longitudinal direction of the vehicle, the stopper unit 31 maintained in the upright position becomes engaged with the second bracket 33, as a result, the upper rail 12 (seat body 15) is limited so as not to move further back than the position of the second bracket 33.

Specifically, in the vehicle V in which the seat device for a vehicle of the present embodiment is provided as shown in FIG. 5, when the seat body 15 is positioned for example in a length L, in other words, the seat body 15 is positioned in front of a seat S, which is provided in the third row in the vehicle V, the stopper unit 31 is engaged with the second bracket 33.

As shown in FIG. 6(A) and FIG. 6(B), the pressing lever 18 is provided on the top of the actuating piece 23b of the lock lever 23. Specifically, the pressing lever 18 is supported by the upper rail 12 so as to be rotatable relative to the central point 18a of the pressing lever 18. As shown in FIG. 6(B), when the pressing lever 18 is rotated in a clockwise direction in FIG. 6(B) relative to the central point 18a, the actuating piece 23b of the lock lever 23 is pressed from the above thereof by means of a top end portion 18b of the pressing lever 18.

On an opposite side where the top end portion 18b is provided relative to the central point 18a, a connecting portion 18c is provided to which a first connecting member 43 is connected. By means of the first connecting member 43, an operation force is transmitted from the unlock lever 41 to the pressing lever 18.

In such circumstances, when the unlock lever 41 is operated, the pressing lever 18 is rotated so that the actuating piece 23b of the lock lever 23 is pressed from the above thereof, and then the lock lever 23 is unlocked, as a result, the upper rail 12 becomes slidable on the lower rail 11. At this point, because the engaging lever 35 is connected to the unlock lever 41 as mentioned above, the engaging lever 35 is also rotated so that the stopper unit 31 is maintained so as to be in the upright position (engaged state). Thus, as shown in a solid line in FIG. 7, the upper rail 12 is limited at the second predetermined position by means of the second bracket 33 so as not to move further back than the position of the bracket 33.

Then, at the second predetermined position, when the unlock lever 41 is operated so as to unlock the second lock mechanism 30, the stopper unit 31 is disengaged from the second bracket 33, and then the lock lever 23 is released from the pressing lever 18 so that the lock lever 18 is rotated in a direction where the lock claws 23a are inserted into the lock holes 1d. However, as shown in FIG. 7, even when the lock claws 23a are rotated so as to insert into the lock holes 11d, because the lock holes 11d are not positioned where the lock claws 23a are supposed to be inserted, the lock claws 23a contact to the inner surface of the inner side wall portions 11b, in other words, the first lock mechanism 20 becomes incapable of being locked at the second predetermined position. Thus, at the second predetermined position, when the unlock lever 41 is operated in order to unlock the second lock mechanism 30, only the second lock mechanism 30 is be unlocked without locking the upper rail 12 to the lower rail 11 by means of the first lock mechanism 20.

Specifically, when the second lock mechanism 30 is unlocked as shown in a chain double-dashed line in FIG. 7, the top end portion 35b of the engaging lever 35, the stopper unit 31 and the lock lever 23 become movable. More specifically, the top end portion 35b of the engaging lever 35 is rotated so as to disengage from the upper end portion of the stopper unit 31, and then the stopper unit 31 is rotated, as a result, the upper rail 12 becomes movable in a backward direction. Then, when the upper rail is further moved in a backward direction, because the lock lever 23 is positioned so as to be able to insert into the lock hole 11d, the first lock mechanism 20 becomes capable of being locked.

In this way, the upper rail 12 can be stopped at the second predetermined position, and then, when the second lock mechanism 30 becomes unlocked, the upper rail 12 becomes capable of sliding in a backward direction, as a result, the first lock mechanism 20 becomes capable of being locked.

A condition in which the stopper unit 31 is maintained at the first predetermined position by means of the stopper bracket 36 so as to be in the upright position will be explained. In this condition, the second lock mechanism 30 limits the upper rail 12 (seat body 15) at the first predetermined position so as not slide in a backward direction by means of the stopper unit 31, the first bracket 32, the second bracket 33 and the stopper bracket 36.

At the first predetermined position, as shown in FIG. 8(A) and FIG. 8(B), the stopper unit 31 is maintained so as to be in the upright position in a manner where the top end portion of the stopper unit 31 is engaged with the stopper bracket 36. Specifically, the stopper bracket 36 is fixed to the seat body 15, and when the seat body 15 is positioned within a predetermined range in a vehicle width direction, the stopper bracket 36 limits the stopper unit 31 so as not to rotate in a first direction (in a clockwise direction in FIG. 8(B)), as a result the stopper unit 31 is maintained so as to be in the upright position (engaged position).

More specifically, for example as shown in FIG. 9, within a vehicle V in which the seat device for a vehicle is provided, when the seat body 15 is positioned within the range W, which extends in a vehicle width direction, because the seat body 15 may hit a wheel house H when the seat body 15 is slid in a backward direction, the stopper unit 31 is maintained in the upright position at the first predetermined position by means of the stopper bracket 36 so as not to move further backward. On the other hand, when the seat body 15 is positioned within the range W, because the stopper bracket 36 is positioned out of the rotation range of the stopper unit 31, the stopper unit 31 is not engaged with the stopper bracket 36. In other words, the stopper unit 31 is disengaged from the stopper bracket 36 so that the seat body 15 becomes capable of sliding in a backward direction.

According to the present embodiment, following effects can be obtained.

Figure 10:
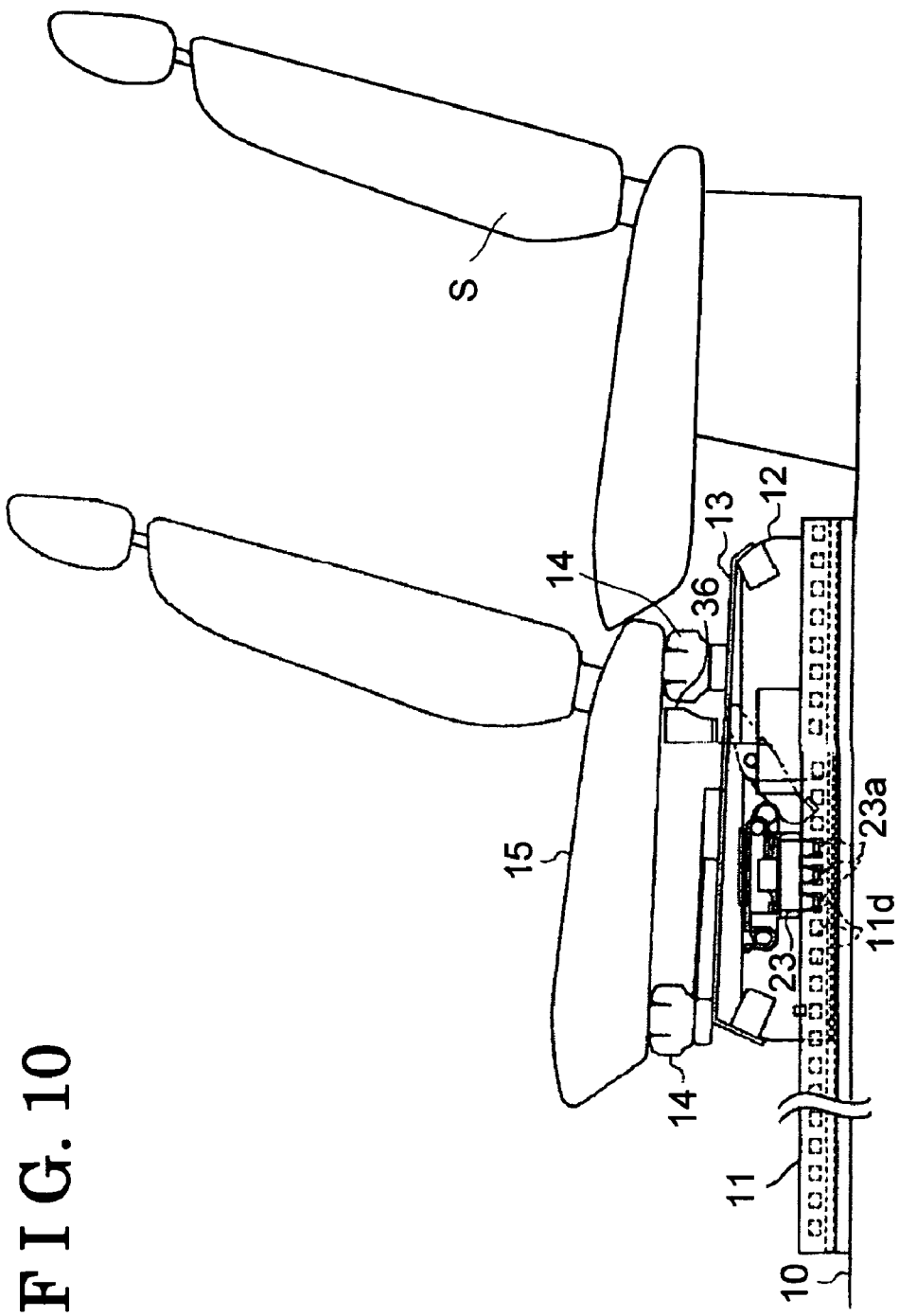

(1) According to the present embodiment, when the first lock mechanism 20 is unlocked so that the upper rail 12 is slid in a backward direction, the upper rail 12 is limited at the first and the second predetermined positions by means of the second lock mechanism 30 so as not to move further backward. Further, when the second lock mechanism 30 is unlocked at the first and the second predetermined positions, the upper rail 12 becomes capable of sliding in a backward direction. Specifically, when the upper rail 12 (seat body 15) is slid in a rearward direction, the upper rail 12 (seat body 15) can be stopped at the first and the second predetermined positions, and then the upper rail 12 (seat body 15) can be slide in a backward direction from the first or the second predetermined position. Thus, when the upper rail 12 is slide widely in a longitudinal direction, because the upper rail 12 can be stopped at the first and the second predetermined portions, it can be prevented that the seat body 15 hits the wheel house H or the like with an large impact force. Further, when the seat body 15 is slide so as to be positioned in front of the of the seat S as shown in FIG. 10, because the seat body 15 can be stopper at the first predetermined position and the second predetermined position, the seat body 15 can be slid in stages. Thus, when the seat body is slide so as to be positioned in front of the seat S, it can be prevented that the seat body 15 hits the seat S with a large impact force, or that a luggage positioned between the seat body 15 and the seat S is wedged therebetween.

(2) According to the present embodiment, when the seat body 15 is positioned at the second predetermined position, because the lock claws 23a contact to the side surface of the lower rail 11, the first lock mechanism 20 can remain in an unlocked state when the seat body 15 is positioned at the second predetermined position. Thus, when the seat body 15 is positioned at the second predetermined position, the upper rail 12 can be slid in a backward direction by unlocking the second lock mechanism 30 without unlocking the first lock mechanism 20, as a result, operationality can be improved.

(3) According to the present embodiment, when the unlock lever 41 is operated, a force for unlocking the first lock mechanism 20 is transmitted to the lock lever 23 by means of the first connecting member 43, at the same time, a force for rotating the engaging lever 35 so as to be engaged with the stopper unit 31 is transmitted by means of the second connecting member 42. Further, at the second predetermined position, when the unlock lever 41 is operated so as to unlock the second mechanism 30, the second lock mechanism 30 can be unlocked while the first lock mechanism 20 is incapable of being locked. In this condition, the seat body 15 can slide in a backward direction.

Thus, the unlock lever 41 is operated in order to slide the upper rail 12 in a backward direction and stop at the second predetermined position, and at this position, the unlock lever 41 is released in order to further slide the upper rail 12 in a backward direction. Thus, the upper rail 12 can slide sequentially only by operating the unlock lever 41, as a result, operationality can be improved.

(4) According to the present embodiment, when the seat body 15 is positioned out of the range W in the vehicle V, the stopper unit 31 is maintained by means of the stopper bracket 35 so as to be in an engaged state, as a result the seat body 15 is limited so as not to move further backward. On the other hand, the seat body 15 is positioned within the range W in the vehicle V, the stopper unit 31 is disengaged from the stopper bracket 35, as a result the seat body 15 can slide in a backward direction. Thus, by means of the stopper bracket 36 provided to the seat body 15, the upper rail 12 (seat body 15) become capable of sliding in a backward direction only within a predetermined range W in the vehicle V.

(5) According to the present embodiment, the first lock mechanism 20 and the second lock mechanism 30 are actuated by operating the unlock lever 41. Specifically, because the unlock lever 41 is not rotated in conjunction with the actuation of another member such as the seat body 15, the seat device can be assembled by mounting the components sequentially. Thus, a process for assembling the seat device can be simplified, as a result, a manufacturing costs can be reduced.

The embodiment may be modified as follow.

Either one of the engaging lever 35 or the stopper bracket 36 may be provided in order to maintain the stopper unit 31 of the second lock mechanism 30 so as to be in the engaged state.

The slide rail 14 in the embodiment may not be provided, and only the engaging lever 35 may be provided in order to maintain the stopper unit 31 of the second lock mechanism 30 so as to be in the upright position.

In the embodiment, the force for operating the unlock lever 41 is transmitted to the pressing lever 18 or the engaging lever 35, however, operation portions to which the force is transmitted respectively may be connected to the pressing lever 18 and the engaging lever 35. Specifically, the operation portion may be connected to the first lock mechanism 20 (pressing lever 18), and the operation portion may also be connected to the second lock mechanism 30 (engaging lever 35).

In the embodiment, the movement of the seat body 15 in a rearward direction is temporally stopped at two positions, however, the movement of the seat body 15 may be modified depending on an inner structure of the vehicle. For example, the seat body 15 may be stopped at only one position, or may be stopped at three positions.

The engaging structure such as the roller members provided between the lower rail 11 and the upper rail 12 in the embodiment may be modified.

The number of the lower rails 11 and the upper rails 12 may be limited to the embodiment, for example, more than three lower rails 11 or the upper rails 11 may be provided to the seat body 15. Even when strength and stability of the vehicle seat is secured, only one lower rail 11 and the upper rail 12 may be provided to the seat body 15.

According to the present invention, when the first lock mechanism is unlocked so that the upper rail is slid in a backward direction, the upper rail is limited at the predetermined position by means of the second lock mechanism so as not to move further backward. Further, when the second lock mechanism is unlocked at the predetermined position, the upper rail becomes capable of sliding in a backward direction. Thus, when the upper rail is moved widely in a longitudinal direction, because the upper rail is stopped at the first position, it can be prevented that the seat body hits an interior equipment with a large impact force.

According to the present invention, after the upper rail is moved in a backward direction when the lock claw is disengaged from the lock hole, the stopper unit being maintained at the engaged state is engaged with the bracket so that the upper rail is limited so as not to move further back than the predetermined position. After the stopper unit is disengaged from the bracket, stopper unit can be moved in a backward direction from the predetermined position. Specifically, the seat body can be stopped at the predetermined position for a while, and then moved further in a backward direction.

Thus, when the upper rail is moved widely in a longitudinal direction, because the upper rail can be stopped at the predetermined position, as a result, it can be prevented that the seat body hits an interior equipment with a large impact force.

According to the present invention, the bracket is positioned in a manner where the lock claw of the lock lever is contact to the side surface of the lower rail, in other words, the lock claw is not engaged with the lock hole when the stopper unit is engaged with the bracket. Specifically, the first lock mechanism is not locked at the predetermined position. Thus, at the predetermined position, regardless of whether the first lock mechanism is locked, the upper rail can be moved in a backward direction by unlocking the second lock mechanism, as a result, operationality can be improved.

According to the present invention, when the operating portion is operated, a force for unlocking the first lock mechanism is transmitted to the lock lever by means of the first connecting member, at the same time, a force for rotating the engaging lever so as to be engaged with the stopper unit is transmitted by means of the second connecting member. Further, at the second predetermined position, when the operating portion is operated so as to unlock the second mechanism, the second lock mechanism can be unlocked while the first lock mechanism is incapable of being locked. Thus, the operating portion is operated in order to slide the upper rail in a backward direction and stop at the predetermined position, and at this position, the operating portion is released in order to further slide the upper rail in a backward direction. Thus, the upper rail can be slid sequentially only by operating the operating portion, as a result, operationality can be improved.

According to the present invention, when the lock claw is disengaged from the lock hole, and the upper rail is slid in a backward direction, the stopper unit maintained in the engaged state is engaged with the bracket, as a result, the upper rail is limited so as not to move further back than the predetermined position. Then, when the seat body is slid in a vehicle width direction, and the stopper unit is disengaged from the stopper bracket, the upper rail can be slidable in a backward direction from the predetermined position. Specifically, when the seat body is moved in a backward direction, the seat body can be stopped at the predetermined position, and then the seat body can be further slid in the backward direction. Thus, when the upper rail is moved widely in a longitudinal direction, because the upper rail can be stopped at the predetermined position, as a result, it can be prevented that the seat body hits an interior equipment with a large impact force.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A seat device for a vehicle comprising:
   a lower rail fixed on the vehicle floor so as to extend in a longitudinal direction of the vehicle;
   an upper rail mounted to the lower rail so as to be slidable;
   a lock lever rotatably supported by the upper rail;
   a lock claw formed on the lock lever;
   lock holes defined in the lower rail in a longitudinal direction thereof;
   a first lock mechanism by which the lock claw is engaged with at least one of the lock holes in order to lock the upper rail at a first position to the lower rail;
   a stopper unit rotatably supported by the upper rail;
   a bracket fixed on the lower rail;
   an engaging lever rotatably fixed to the upper rail for maintaining the stopper unit in an engaged state;
   a second lock mechanism for limiting the upper rail so as not to move further than a predetermined position by rotating the engaging lever in order to maintain the stopper unit in the engaged state, in which the stopper unit is engaged with the bracket,
   wherein the bracket is positioned where the upper rail is limited so as not to move further than the predetermined position while the lock claw contacts a side surface of the lower rail; and
   an operating portion to which a first connecting member and a second connecting member are connected, the first connecting member transmitting an operation force for unlocking the lock lever, and the second connecting member transmitting a force for rotating the engaging lever.

2. A seat device for a vehicle according to claim 1, wherein the engaging lever is provided on top of the upper rail so as to be rotatable.

3. A seat device for a vehicle according to claim 1, wherein the operating portion unlocks the first lock mechanism and locks the second lock mechanism, when the operating portion is operated, and unlocks the second lock mechanism when the operating portion is not operated.

4. A seat device for a vehicle, comprising:
- a lower rail fixed on the vehicle floor so as to extend in a longitudinal direction of the vehicle;
- an upper rail mounted to the lower rail so as to be slidable;
- a slide rail provided on top of the upper rail in a vehicle width direction and supporting the seat body so as to be slidable;
- a lock lever rotatably supported by the upper rail;
- a lock claw formed on the lock lever;
- lock holes defined in the lower rail continuously in a longitudinal direction thereof;
- a first lock mechanism by which the lock claw is engaged with at least one of the lock holes in order to lock the upper rail at a first position to the lower rail;
- a stopper unit rotatably supported by the upper rail;
- a bracket fixed on the lower rail;
- a stopper bracket which is configured to be fixed to the seat body and for maintaining the stopper unit so as to be in an engaged state;
- a second lock mechanism for limiting the upper rail so as not to move further than a predetermined position by maintaining the stopper unit so as to be in the engaged state, in which the stopper unit is engaged with the bracket, by means of the stopper bracket when the seat body is slid on the slide rail to be positioned within a predetermined range in the vehicle width direction; and
- an operating portion which unlocks the first lock mechanism and locks the second lock mechanism, when the operating portion is operated, and which unlocks the locked condition of the second lock mechanism when the operating portion is not operated.

5. A seat device for a vehicle, comprising:
- a lower rail fixed on the vehicle floor so as to extend in a longitudinal direction of the vehicle;
- an upper rail mounted to the lower rail so as to be slidable;
- a lock lever rotatably supported by the upper rail;
- a lock claw formed on the lock lever;
- lock holes defined in the lower rail in a longitudinal direction thereof;
- a first lock mechanism by which the lock claw is engaged with at least one of the lock holes in order to lock the upper rail at a first position to the lower rail;
- a stopper unit rotatably supported by the upper rail;
- a bracket fixed on the lower rail;
- an engaging lever rotatably fixed to the upper rail for maintaining the stopper unit in an engaged state;
- a second lock mechanism for limiting the upper rail so as not to move further than a predetermined position by rotating the engaging lever in order to maintain the stopper unit in the engaged state, wherein the stopper unit is engaged with the bracket; and
- an operating portion to which a first connecting member and a second connecting member are connected, the first connecting member transmitting an operation force for unlocking the lock lever, and the second connecting member transmitting a force for rotating the engaging lever.

* * * * *